United States Patent
Wang et al.

(10) Patent No.: US 9,563,932 B2
(45) Date of Patent: Feb. 7, 2017

(54) TECHNIQUES TO REQUEST STORED DATA FROM MEMORY

(75) Inventors: Kebing Wang, Shanghai (CN); Jun Ye, Shanghai (CN); Jinlong Hou, Shanghai (CN)

(73) Assignee: INTEL Corporation, Santa Clara, CA (US)

( * ) Notice: Subject to any disclaimer, the term of this patent is extended or adjusted under 35 U.S.C. 154(b) by 593 days.

(21) Appl. No.: 13/976,624

(22) PCT Filed: Jan. 28, 2011

(86) PCT No.: PCT/CN2011/000135
§ 371 (c)(1),
(2), (4) Date: Oct. 11, 2013

(87) PCT Pub. No.: WO2012/100373
PCT Pub. Date: Aug. 2, 2012

(65) Prior Publication Data
US 2014/0028694 A1    Jan. 30, 2014

(51) Int. Cl.
*G06T 1/60* (2006.01)
*G06T 15/04* (2011.01)

(52) U.S. Cl.
CPC ....... *G06T 1/60* (2013.01); *G06T 15/04* (2013.01)

(58) Field of Classification Search
CPC .......... G06T 15/04; G06T 15/005; G06T 1/20; G06T 17/00; G06T 17/20; G06T 13/20; G06T 13/40; G06T 1/60; G06T 7/00
See application file for complete search history.

(56) References Cited

U.S. PATENT DOCUMENTS

| 6,353,438 | B1 | 3/2002 | Van Hook et al. |
| 6,559,842 | B1* | 5/2003 | Deering .................. G06T 17/20 345/420 |
| 6,924,811 | B1 | 8/2005 | Minkin |
| 2002/0060684 | A1 | 5/2002 | Alcorn et al. |
| 2008/0204466 | A1* | 8/2008 | Yu .......................... G06F 12/0846 345/552 |

FOREIGN PATENT DOCUMENTS

| TW | 200421179 A | 10/2004 |
| TW | 200725264 A | 7/2007 |
| WO | 2012100373 A1 | 8/2012 |

OTHER PUBLICATIONS

International Search Report and Written Opinion received for International Application No. PCT/CN2011/000135, mailed on Nov. 10, 2011, 9 pages.

(Continued)

*Primary Examiner* — Maurice L McDowell, Jr.
*Assistant Examiner* — Raffi Isanians
(74) *Attorney, Agent, or Firm* — Finch & Maloney PLLC (57) ABSTRACT

Techniques are described to generate an index for a texture. The index can be used to retrieve a portion of one or more textures from a cache. The index can be adapted based on static texture attributes or direction attributes in order to attempt to achieve texture cache efficiency. Static texture attributes can include, bit are not limited to, 1-dimensional texture, 2-dimensional texture, 3-dimensional texture, or MIPmaps texture, original memory address. Direction attributes can be, but are not limited to, u-major or v-major directions.

18 Claims, 5 Drawing Sheets

(56) References Cited

OTHER PUBLICATIONS

International Preliminary Report on Patentability received for PCT Patent Application No. PCT/CN2011/000135, mailed on Jul. 30, 2013, 4 pages.
Kim, Chun-Ho and Kim, Lee-Sup, "Adaptive Selection of an Index in a Texture Cache," in Proc. Int. Conf. Computer Design, Oct. 2004. 6 pages.

* cited by examiner

TECHNIQUES TO REQUEST STORED DATA FROM MEMORY

FIELD

The subject matter disclosed herein relates generally to graphics, and more particularly to techniques for providing a texture cache index hash.

RELATED ART

To add texture to a three-dimensional surface, a process known as texture mapping is used whereby texture elements (texels) are mapped to appropriate pixels in the output picture. Texture mapping is a method for adding detail, surface texture (a bitmap or raster image), or color. A texture map is applied or mapped to the surface of a shape or polygon. A texel is a fundamental unit in texture space. Textures are represented by arrays of texels, just as pictures are represented by arrays of pixels. The texturing process starts with a location in space. A projector function is applied to the location to change the location from a three-element vector to a two-element vector (u, v) with values ranging from zero to one. These values are multiplied by the resolution of the texture to obtain the location of the texel.

Figure 1:
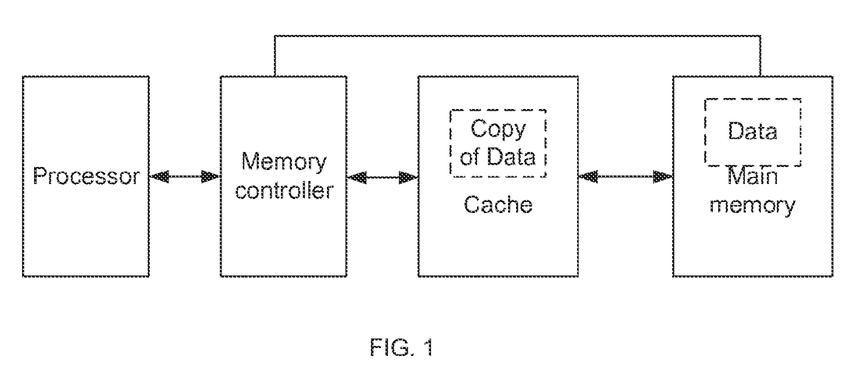
FIG. 1 is a block diagram of a system that uses a texture cache that allows rapid texel accesses.

FIG. 1 is a block diagram of a system that uses a texture cache that allows a graphics controller, graphics processing unit, or central processing unit (CPU) to rapidly access texels. Texels are accessed from the texture cache. A texture cache can be used to alleviate the outgoing memory traffic from a graphics memory or main memory. In some cases, a texture cache separately stores a texel's red, blue, and green components. If the processor needs data that is not available in the cache, the processor can read the data from the memory and overwrite existing data in the cache.

In a texture cache, memory addressing can take place using direct mapping, associative mapping, or n-way set-associative mapping, where n is an integer greater or equal to 1. Many graphics processing unit (GPU) vendors have adopted n-way set associative mapping. In a set associative system, the main memory address is broken up into 3 sections: tag, index, and offset. The tag is used to determine whether the required block is stored in the cache (i.e., a cache hit check), the index identifies the set number in cache, and the offset specifies the location of the data within a cache line.

Figure 2:
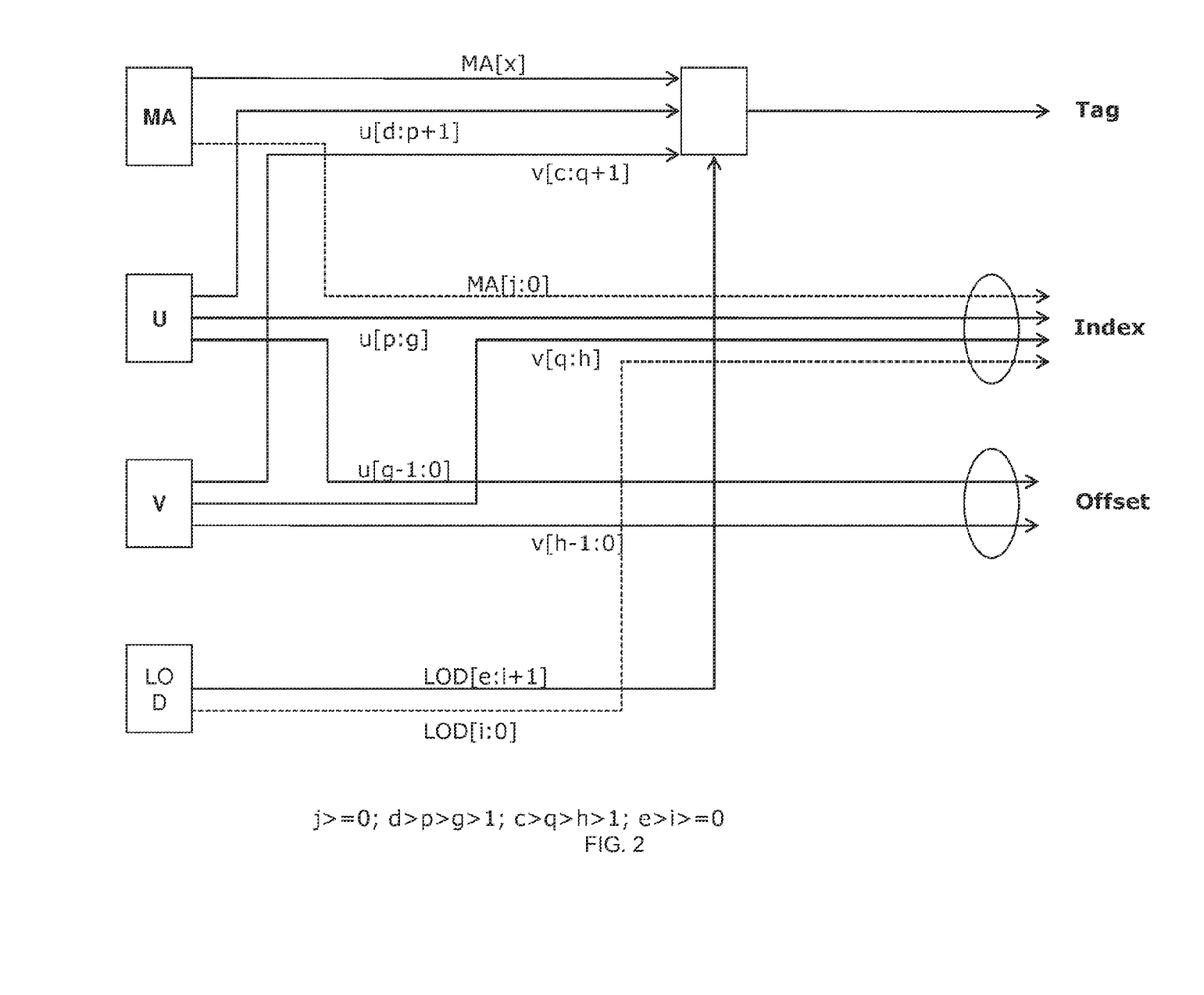
FIG. 2 is a conceptual block diagram of a cache address generator used for providing a tag, index, and offset.

FIG. 2 is a conceptual block diagram of a cache address generator used for providing a tag, index, and offset. The tag, index, and offset can be determined based on coordinates u and v, a texture's original memory address (MA), and level of detail (LOD). A texture has an origin at u, v, where u, and v are relative to the memory address MA in main memory. To locate an absolute address corresponding to the origin of a portion of a texture in a cache, a cache controller adds the texture original memory address MA to the relative coordinate values u and v. This absolute address is then referred to as the tag.

All GPU vendors currently use a fixed texture cache index hash in which the bits of the index part are fixed for any situation. However, DirectX and OpenGL support many types of textures, such as 1-dimensional, 2-dimensional, 3-dimensional, and MIPmaps. In cases where there are different types of textures, acceptable cache efficiency for all these types of textures may not be achieved by using a fixed texture cache index hash. The performance of a cache is directly related to the likelihood of the cache containing the desired information. If the desired information is available from the cache when requested, a "cache hit" results, and the desired information can be quickly retrieved from the cache. However, if the desired information is not available from the cache when requested, a "cache miss" results.

Some known GPU hardware use a fixed number of bits from both u and v (for example, 2 bits of v) to generate the index hash. A 1-dimensional texture can only access 25% of the total texture cache size. However, the texture cache effective size decreases 75% for a 1-dimensional texture, because a v coordinate of a 1-dimension texture is always 0. Accordingly, cache hit efficiency using a fixed number of bits of u and v to generate the index hash can be very low.

Figure 3:
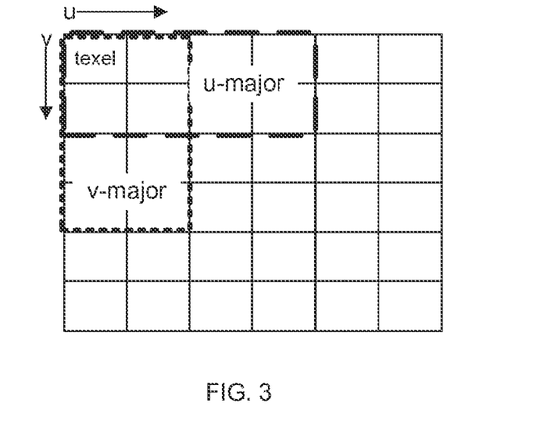
FIG. 3 shows that a sampling pattern may generally be shapes denoted u-major and v-major.

In 3D computer graphics, anisotropic filtering is a common method of enhancing image quality of textures on surfaces. Anisotropic filtering samples an area of texels that closely approximates the shape of the pixel projection. Anisotropic filtering uses non-square sampling patterns whose length varies. For example, sampling patterns can be rectangular, trapezoidal, or parallelogram-shaped. FIG. 3 shows that a sampling pattern for anisotropic filtering of a texture image may generally be rectangle shapes. In FIG. 3, a block represents a texel and a texture is made of blocks. When $|\Delta u|$ is greater than $|\Delta v|$, the rectangle is called u-major and is a general horizontal orientation in u, v space. When $|\Delta v|$ is greater than $|\Delta u|$, the rectangle is called v-major and is a general vertical orientation in u, v space. For access of a u-major pattern, a texture cache gets better performance (i.e., higher hit rate) if the index includes more bits for the u coordinate. However, for access of a v-major pattern, the texture cache gets better performance if the index includes more bits for the v coordinate. Accordingly, use of a fixed cache line index may not achieve acceptable performance for cache accesses of texels in all directions.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In various embodiments, a cache index generator provides a cache index signal based on real-time static texture attributes and/or a dynamic access conditions. Static texture attributes include, but are not limited to, 1-dimensional texture, 2-dimensional texture, MIPmaps texture, or texture original memory address register. Dynamic access conditions can include, but are not limited to, u-major and v-major access directions. Static attributes of a desired texture may be set up through specific application program interfaces (APIs) of versions of DirectX or OpenGL. These static attributes may be stored in specific registers, which can provide the information to the cache index generator when a texture is to be read from the texture cache.

Various embodiments use performance counters to indicate dynamic access condition to the cache index generator. For example, performance counters can consider dynamic texture usage events, such as a cache miss or texture map direction, in determining dynamic access direction for each texture. The GPU driver can store the access direction of one or more textures so that when the same texture is accessed again, the access direction is available for consideration in generating the index.

Figure 4:
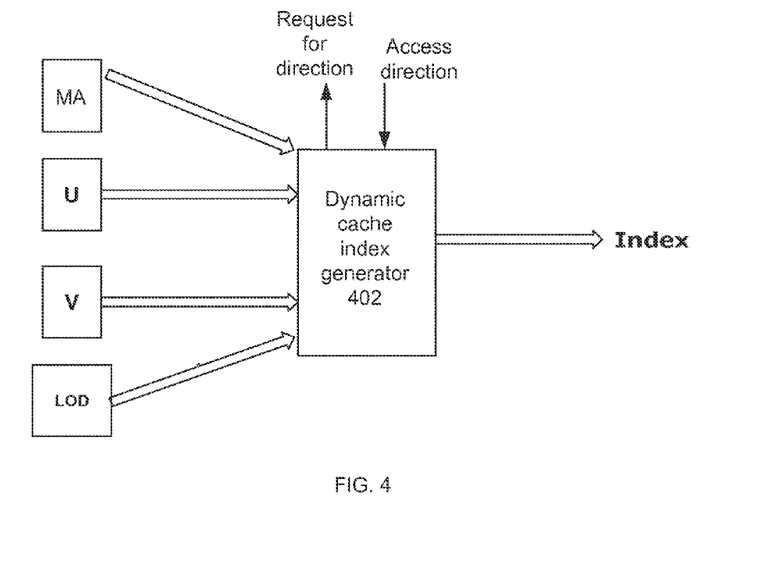
FIG. 4 depicts a system that can be used to generate a cache index.

FIG. 4 depicts a system that can be used to generate a cache index. The index can be used to access a row in a direct mapped cache or an n-way associative cache. The cache index can be adapted based on real-time texture mapping conditions in order to attempt to improve texture cache hit efficiency. In some embodiments, dynamic cache index generator 402 can generate the index based in part on real-time static texture attributes and/or texture access direction. The index can be used to select a row in a cache tag array to retrieve a desired portion of one or more texels.

Dynamic cache index generator 402 can access attributes from registers or buffers that store a memory address register (shown as MA), coordinates U and V, as well as level of detail (shown as LOD). MA is the original address of the texture, which is determined when it is loaded into graphics or main memory. A texture sample instruction can provide U, V, and LOD to one or more registers or buffers. For example, instructions in OpenGL and DirectX 11 can provide the U, V, and LOD to one or more registers or buffers.

In various embodiments, performance counters can provide a texture access direction to dynamic cache index generator 402 in the following manner. Two performance counters can be used. A first counter is to count occurrence of an event that $\Delta u$ of a sample footprint is bigger than $\Delta v$ and a second counter is to count occurrence of an event that $\Delta v$ of a sample footprint is bigger than $\Delta u$. The texture access direction can be determined by comparing the values of these two counters. If first counter is greater than second counter for some number of intervals, then the access direction is considered u major. If second counter is greater than first counter for some number of intervals, then the access direction is considered v major. In various embodiments, a GPU samples the performance counters at a fixed interval to detect the real time access direction to determine an index generation technique to use.

The following describes index generation considering texture attributes such as shape (e.g., 1-D, 2-D, or 3-D), level of detail, or memory address register. A 1-dimensional (1-D) texture can be 1 pixel in width or height but not both. To retrieve a 1-D texture, the index may only involve bits of u. For a 1-D texture, the access direction could only be u-major, because v coordinate value is always 0. So the index does not include bits of the v coordinate. A 2-dimensional texture has width and height both more than a pixel. To retrieve a 2-dimensional texture, the cache index may include both bits of u and v. To retrieve a 3-dimensional texture, the cache index may include bits of all 3 coordinates. To retrieve a MIPmaps texture, the index may include the least significant bit (LSB) of LOD as well as bits of u and v. For MIPmaps, the total number of bits in u and v used for the index can be 1 bit less than that used for 2-D textures. The exact index generator method used depends at least on the texture cache structure, such as set number and way number.

When a shader program accesses several textures simultaneously, MA could be used to generate the index. Before a shader program is used, the shader program could be compiled by a GPU driver. The GPU driver can tell the GPU that several textures are used and MA is to be considered. This may avoid different textures overwriting each other because different textures have different origins. Accordingly, the index could include a relative high-significant bit or bits of MA to avoid this.

The following describes index generation considering dynamic access conditions. To generate an index for access of a u-major rectangle, the index may include more bits of u than v, or even only use bits of u. For access of a v-major rectangle, the index may include more bits of v than u, or even only use bits of v.

For all the previous conditions, the total bit width of the index is fixed and determined by the way number (N) of the cache, which equals $\log_2 N$. But the bits of the index are adjusted according to the real-time texture static attributes and dynamic access condition.

A texture could be used several times in a workload. When a texture is first used, the static attributes are considered before loading into a cache. When the texture is reused, the static attributes and previous dynamic usage statistics are both considered for generating the index. Driver can store some previously texture usage information. At a fixed interval, the GPU uses performance counters to determine u major or v major access direction. The real-time texture usage statistics could be stored by a driver, which could be considered when the texture reused.

For example, consider sequential texture accesses 1-5 below.

Access 1: access texture 1 first time (u major).
Access 2: access texture 1 again.
Access 3: access texture 2 first time (v major).
Access 4: access texture 3 first time (u major).
Access 5: access texture 2 again.

For access 1, it is the first time to access texture 1, so the static texture attributes of texture 1 are considered. During access 1, a GPU can sample performance counters at an interval (e.g., 1 ms interval) and detect access direction of texture 1 based on performance event values comparisons. For access 2, texture 1 is accessed again, so the static texture attributes and u major access direction characteristic of texture 1 are considered. For access 3, it is the first time to access texture 2, so the static texture attributes of texture 2 are considered. During access 3, a GPU can sample performance counters at an interval (e.g., 1 ms) and detect access direction of texture 2 based on performance event values comparisons. For access 4, texture 3 is accessed for the first time so the static texture attributes of texture 3 are considered. During access 4, a GPU can sample performance counters at an interval (e.g., 1 ms) and detect access direction of texture 3 based on performance event values comparisons. For access 5, it is the second time to access texture 2, so the static texture attributes and v major characteristics of texture 2 are considered.

Accordingly, by adjusting the index based on the static texture attributes and/or access direction, cache hit results can potentially be improved. Based on the 3DMarkVantage benchmark, changing the cache index hash by considering texture attributes and/or texture access direction may boost performance of approximately five times for specific draw calls compared to a traditional methods of using a fixed texture cache index.

Figure 5:
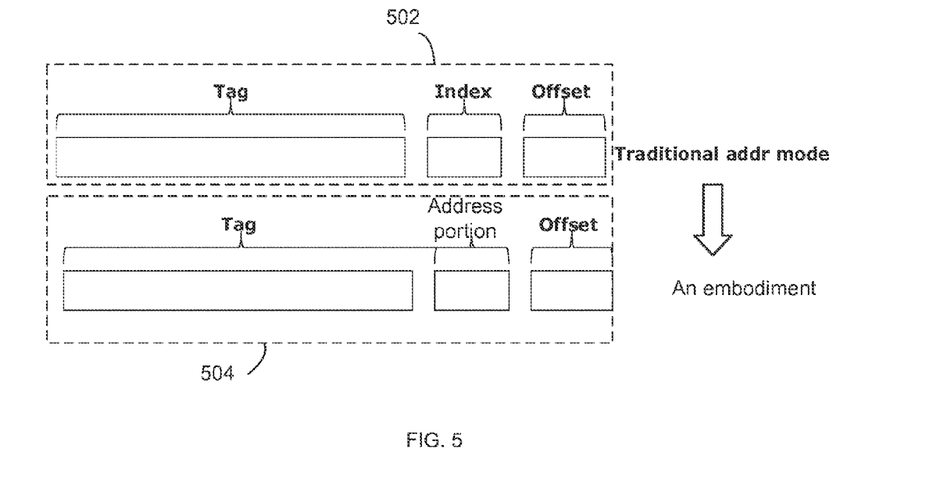
FIG. 5 depicts examples of tags.

FIG. 5 depicts examples of tags. Item 502 shows that an address is divided into 3 parts: tag, index, offset for a direct-mapped or set associative cache. Item 504 shows that an address is divided into 2 parts: tag and offset for fully associative mapped cache. In various embodiments, although a cache is set associative, the address is also divided into 2 parts: tag and offset. In various embodiments, the index generated using techniques of FIG. 4 does not include the address information that can be used to determine whether a cache hit has occurred. Instead of the index including such address information, the bit width of the tag is enlarged to include such address information originally carried by a traditional index segment. For example, for a set associative system, the address information originally carried by a traditional index segment would be some of the least significant bits (LSB) of a block address in main memory of the texture.

Figure 6:
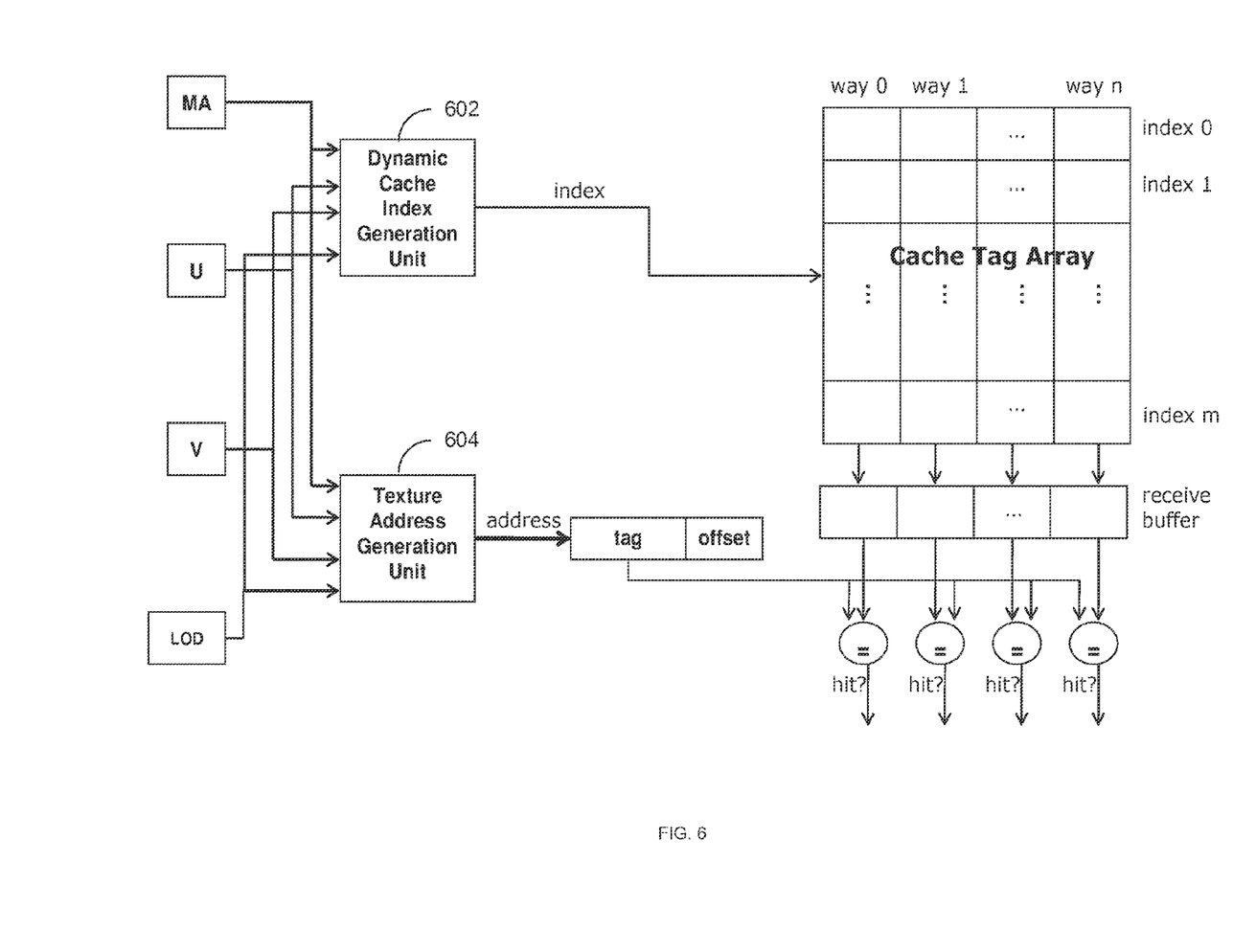
FIG. 6 depicts an example of a texture access using an index generated by a dynamic cache index generator.

FIG. 6 depicts an example of a texture access from an n-way associative cache. Dynamic cache index generation unit 602 can provide an index based on zero or more bits from MA, U, V, and LOD. A set (row) in the cache can be accessed using the index. Techniques described with regard to FIG. 4 can be used to determine the index based on real-time static texture attributes and/or texture access direction.

Texture address generation unit 604 can provide an address based on MA, U, V, and/or LOD. The address generating method can be determined by the GPU vendor. Texture address generation unit 604 can provide the tag and offset. The tag can include the most significant bits (MSB) of the address and is used for tag comparison. The tag can be used to determine whether a column (way) corresponds to desired content, i.e., a hit. The offset can include the least significant bits (LSB) of the address and is used to locate bytes in a cache line. Tag comparison involves comparing all tags in the set specified by the index. If the tag is present in the set specified by the index, a cache hit has occurred, and the required data can be found at the offset of the data.

When the index is fixed and not adapted based on real-time texture attributes and/or texture access direction, the index includes a portion of a physical memory address of the texel and that portion is used to determine which cache set (row) is accessed. However, when the index is adaptable as in embodiments described herein, the index part not only indicates which cache set is accessed, but is also used in the tag for tag comparison to determine whether a cache hit has occurred.

Figure 7:
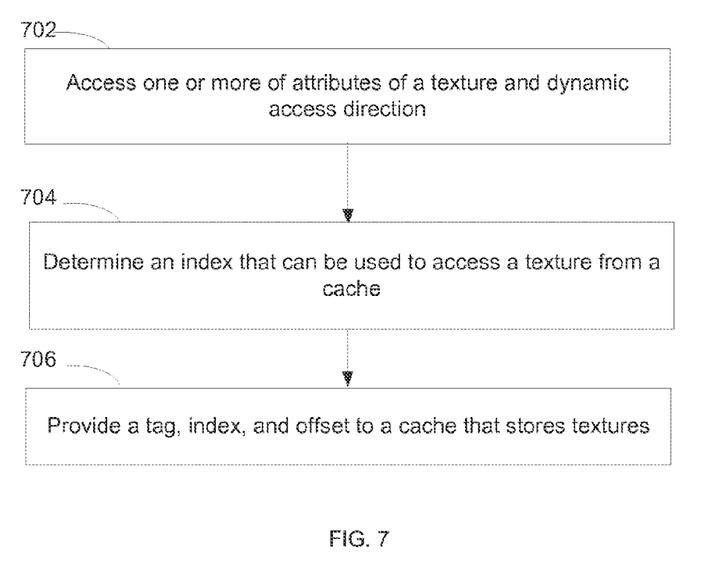
FIG. 7 depicts a process in accordance with an embodiment.

For example, if the cache has 8 sets and uses 2 bits of u and 1 bit of v to access cache set, then when set 0 is accessed, the 2 bits of u and 1 bit of v used for index are intrinsically all zero. So, when tag comparison occurs, these 2 bits of u and 1 bit of v are not compared to determine whether a cache hit occurred. In various embodiments, the index is changed based on real-time attributes and dynamic access conditions. When set 0 is accessed, the 2 bits of u and 1 bit of v are not necessarily zero because the index could be made up of 3 bits of u, or 3 bits of v, or 1 bit of u and 1 bit of v and 1 bit of LOD, or other combinations. When tag comparison occurs, the original index address bits inserted into the tag are compared to determine whether a cache hit occurred, FIG. 7 depicts a process in accordance with an embodiment.

Block 702 includes accessing one or more attributes of a texture and dynamic access direction.

Block 704 includes determining an index that can be used to access a texture from a cache. The index can be generated using portions of coordinates u and v, a texture original memory address (MA), and level of detail (LOD). The amount of portions used in the index can be determined using real-time criteria such as texture attributes (e.g., 1-D, 2-D, 3-D, MIPmaps, or MA) and in some cases, access direction (e.g., u-major or v-major). The index can be used to identify a set (row) in a cache tag array.

Block 706 includes providing a tag, index, and offset to a cache that stores texels. The tag can be configured in the manner described with regard to FIG. 5. The tag can include some bits of a block address of the desired texel. The tag can be used to determine whether a column (way) corresponds to desired content, i.e., a hit. The offset can include the least significant bits (LSB) of the address. The offset can be used to locate bytes in a cache line.

Thereafter, a cache that stores textures can determine if a cache hit has occurred based on whether the tag is present in the set specified by the index. The requested data can be found at the offset of the data.

Figure 8:
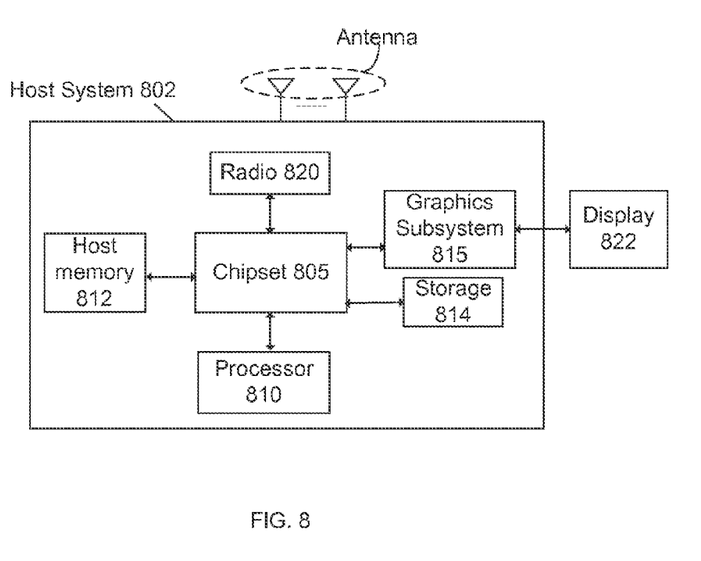
FIG. 8 provides an example of a system in accordance with an embodiment.

FIG. 8 provides an example of a system in accordance with an embodiment. The system can be used in a mobile station, user element, netbook, handheld computer, handheld phone, and so forth. Computer system 800 may include host system 802 and display 822. Computer system 800 can be implemented in a handheld personal computer, mobile telephone, set top box, or any computing device. Any type of user interface is available such as a keypad, mouse, touch screen, and/or gesture or motion recognition. Host system 802 may include chipset 805, processor 810, host memory 812, storage 814, graphics subsystem 815, and radio 820. Chipset 805 may provide intercommunication among processor 810, host memory 812, storage 814, graphics subsystem 815, and radio 820. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit. In various embodiments, processor 810 can be configured with instructions to perform techniques described herein.

Host memory 812 may be implemented as a volatile memory device such as but not limited to a Random Access Memory (RAM), Dynamic Random Access Memory (DRAM), or Static RAM (SRAM). Storage 814 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 815 may perform processing of images such as still or video for display. An analog or digital interface may be used to communicatively couple graphics subsystem 815 and display 822. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. In various embodiments, graphics subsystem 815 can be configured to perform techniques described herein.

Radio 820 may include one or more radios capable of transmitting and receiving signals in accordance with applicable wireless standards such as but not limited to any version of IEEE 802.11, IEEE 802.16, and 3GPP LTE. For example, radio 820 may include at least a physical layer interface and media access controller. Radio 820 can include a baseband processor to perform techniques described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
   accessing static attributes of a texture, the texture potentially stored in a cache;
   determining an access direction of the texture, the access direction specifying a direction of sampling of the texture from the cache;
   determining an index for the texture based in part on the static attributes and the access direction, wherein the index is based on one or more of u, v coordinates, level of detail, and original texture address;
   requesting formation of a tag for the texture, wherein the tag comprises a portion of a main memory address of the texture; and
   determining if the texture is stored in the cache based on the index and the tag.

2. The method of claim 1, wherein the static attributes of a texture include one or more of a 1-dimensional texture, 2-dimensional texture, and a MIPmaps format texture, and original memory address.

3. The method of claim 1, wherein the access direction of the texture comprises one of u-major and v-major.

4. The method of claim 1, wherein the tag portion of the main memory address comprises: one or more least significant bits of a block address in main memory of the texture.

5. The method of claim 1, wherein attempting to access an access direction of the texture comprises periodically accessing results from performance counters, the performance counters indicating whether prior access directions were in a u major or v major direction.

6. The method of claim 1, wherein determining an index for the texture based in part on the static attributes and the access direction comprises:
   for a first access of the texture, determining the index using the static attributes and
   for a subsequent access of the texture, determining the index using the static attributes and access direction.

7. An apparatus comprising:
   a processor;
   index generator logic at least one of executable and controllable by the processor, to:
      access static attributes of a texture from one or more register,
      determine an access direction of the texture, the access direction specifying a direction of sampling of the texture from a cache, and
      determine an index for the texture based in part on the static attributes and the access direction, wherein the index is based on one or more of u, v coordinates, level of detail, and original texture address, and
      output the index and
   texture address generation logic at least one of executable and controllable by the processor, to provide a tag and offset; and
   the cache to store one or more textures and to provide a texture based on the index, tag, and offset.

8. The apparatus of claim 7, wherein the static attributes of a texture include one or more of: 1-dimensional, 2-dimensional, a MIPmaps format, and original memory address.

9. The apparatus of claim 7, wherein the access direction of the texture comprises one of u-major and v-major.

10. The apparatus of claim 7, wherein the texture address generation logic is to provide a tag that comprises one or more least significant bits of a block address in main memory of the texture.

11. The apparatus of claim 7, wherein to request to access an access direction of the texture, the index generator logic is to periodically access results from performance counters, the performance counters indicating whether prior access directions were in a u major or v major direction.

12. The apparatus of claim 7, wherein to determine an index for the texture, the index generator logic is to:
for a first access of the texture, determine the index using the static attributes and
for a subsequent access of the texture, determine the index using the static attributes and access direction.

13. A system comprising:
a display device;
an antenna;
a radio communicatively coupled to the antenna;
a memory device that stores one or more textures;
a graphics processing unit configured to:
  access static attributes of a texture from one or more register,
  determine an access direction of the texture, the access direction specifying a direction of sampling of the texture from a cache,
  determine an index for the texture based in part on the static attributes and the access direction, wherein the index is based on one or more of u, v coordinates, level of detail, and original texture address,
  provide a tag and offset, and
  output the index, tag, and offset; and
the cache to store one or more textures and to provide a texture based on the index, tag, and offset.

14. The system of claim 13, wherein the static attributes of a texture include one or more of: 1-dimensional, 2-dimensional, MIPmaps, and an original memory address.

15. The system of claim 13, wherein the access direction of the texture comprises one of u-major and v-major.

16. The system of claim 13, wherein the graphics processing unit is to provide a tag that comprises at least one significant bit of a block address in main memory of the texture.

17. The system of claim 13, wherein to request to access an access direction of the texture, the graphics processing unit is to periodically access results from performance counters, the performance counters indicating whether prior sample directions were in a u major or v major direction.

18. The system of claim 13, wherein to determine an index for the texture, the graphics processing unit is to:
for a first access of the texture, determine the index using the static attributes and
for a subsequent access of the texture, determine the index using the static attributes and the access direction.

* * * * *